United States Patent
Dang

(10) Patent No.: US 7,136,233 B2
(45) Date of Patent: Nov. 14, 2006

(54) DEVICE FOR THE GENERATION AND PROJECTION OF LIGHT MARKS

(75) Inventor: Lieu-Kim Dang, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 83 days.

(21) Appl. No.: 10/822,618

(22) Filed: Apr. 12, 2004

(65) Prior Publication Data
US 2004/0207848 A1 Oct. 21, 2004

(30) Foreign Application Priority Data
Apr. 17, 2003 (DE) .............................. 103 17 958

(51) Int. Cl.
G02B 5/04 (2006.01)
G02B 13/18 (2006.01)
G02B 3/06 (2006.01)

(52) U.S. Cl. ..................... 359/710; 359/615

(58) Field of Classification Search ................ 359/615, 359/710, 707, 718, 641, 738; 355/71
See application file for complete search history.

(56) References Cited

U.S. PATENT DOCUMENTS 6,583,931 B1 * 6/2003 Hiraiwa et al. ............... 355/71

* cited by examiner

Primary Examiner—Alicia M Harrington
(74) Attorney, Agent, or Firm—Abelman, Frayne & Schwab

(57) ABSTRACT

A device (1) for generating and projecting light marks (MP, ML) in which projection optics (P) have a cylindrical lens (Z). The cylindrical lens (Z) can be irradiated by a light beam bundle (L2) such that a central beam bundle (L2Z) radiates completely through a cylinder portion area (A) and at least one marginal beam bundle (L2R) travels directly past the edge of the outer surface of the cylinder portion area (ZA). A light mark (ML) in the shape of a line is projected by the central beam bundle (L2Z), while a light mark (MP) in the shape of a point is projected through the marginal beam bundle (L2R).

18 Claims, 14 Drawing Sheets

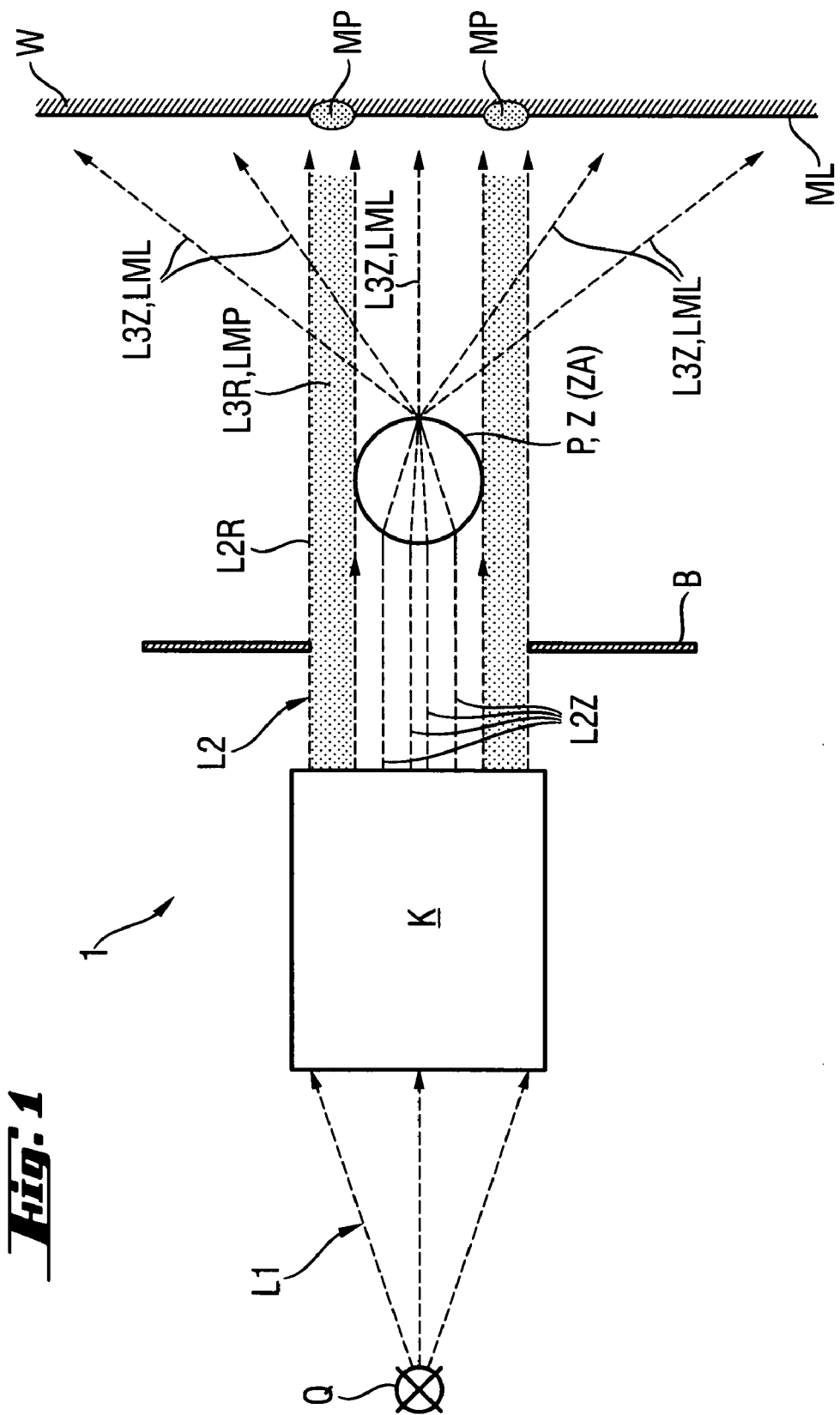

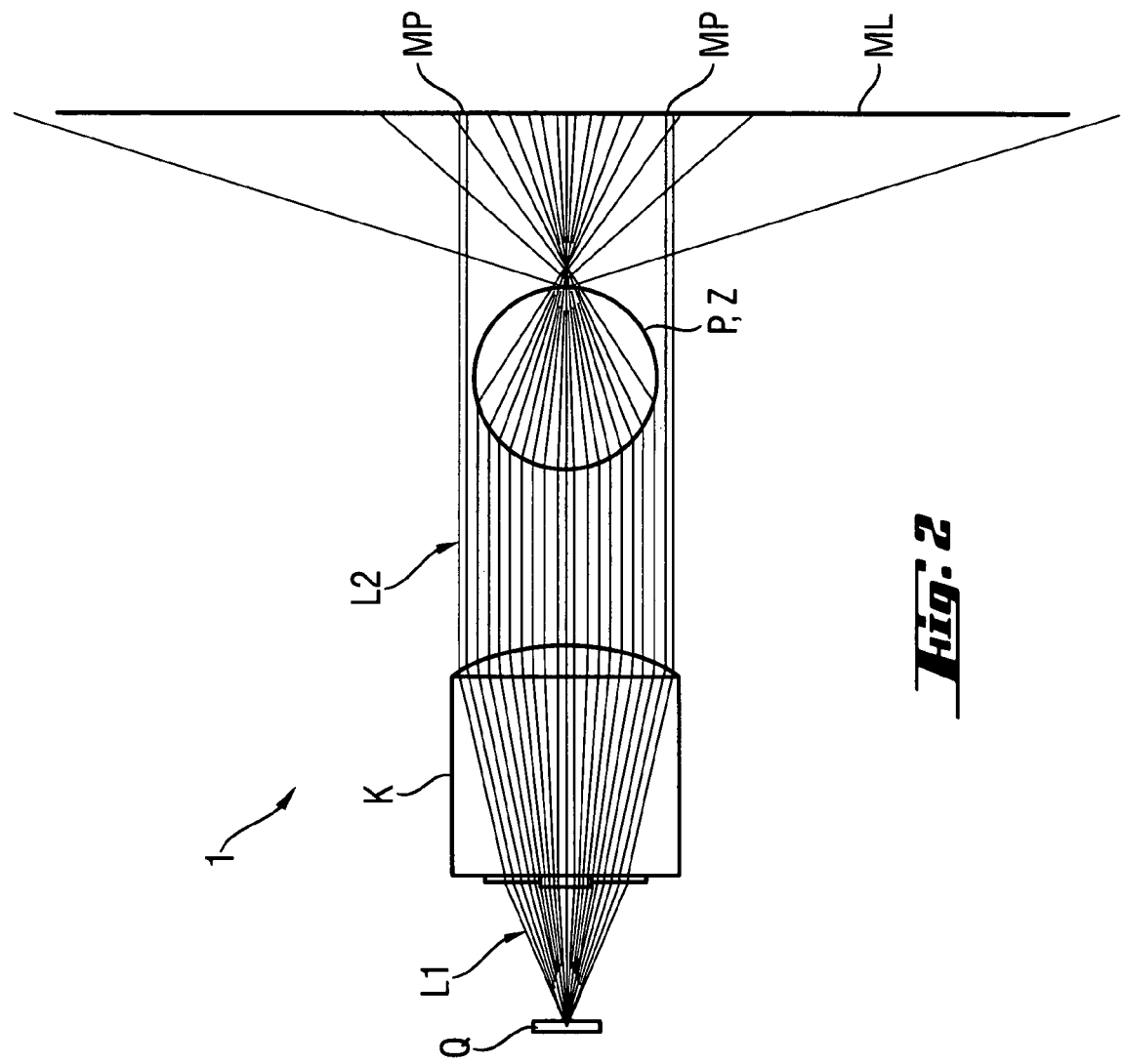

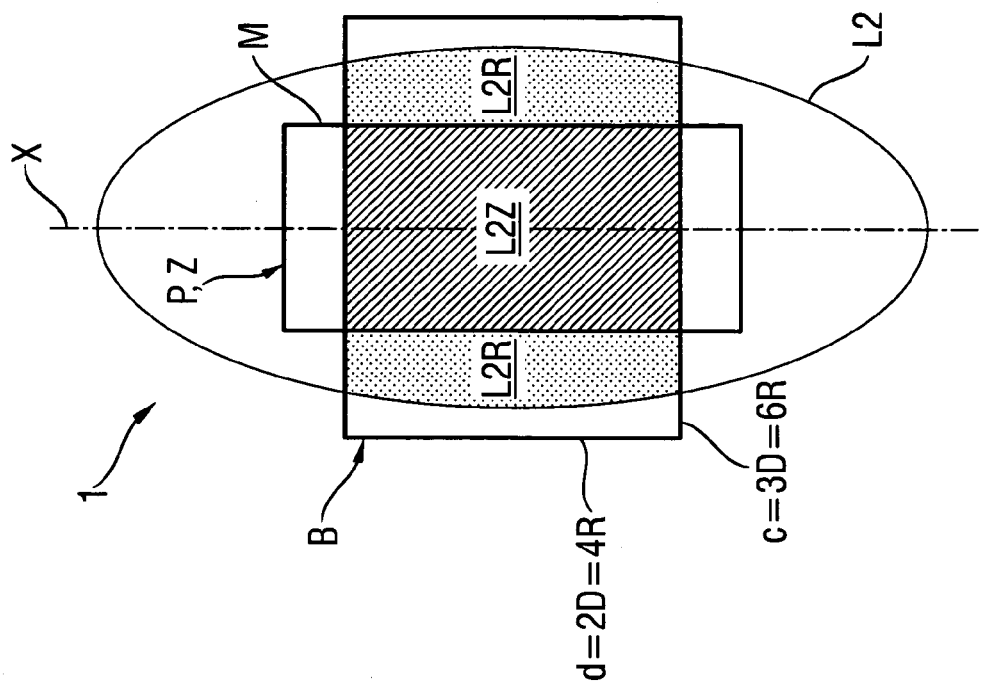
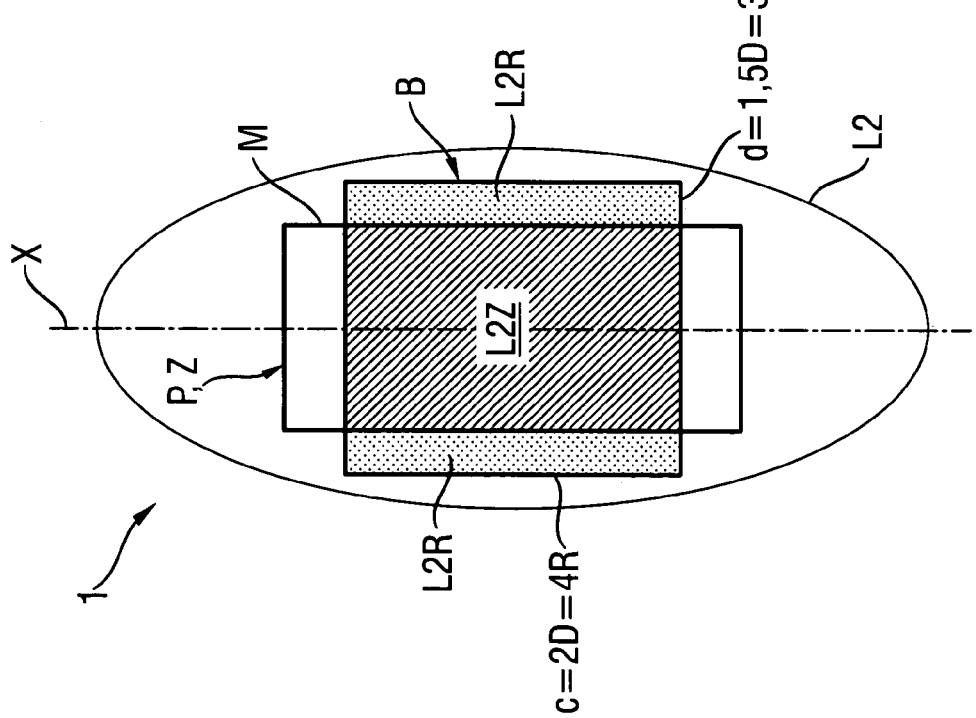

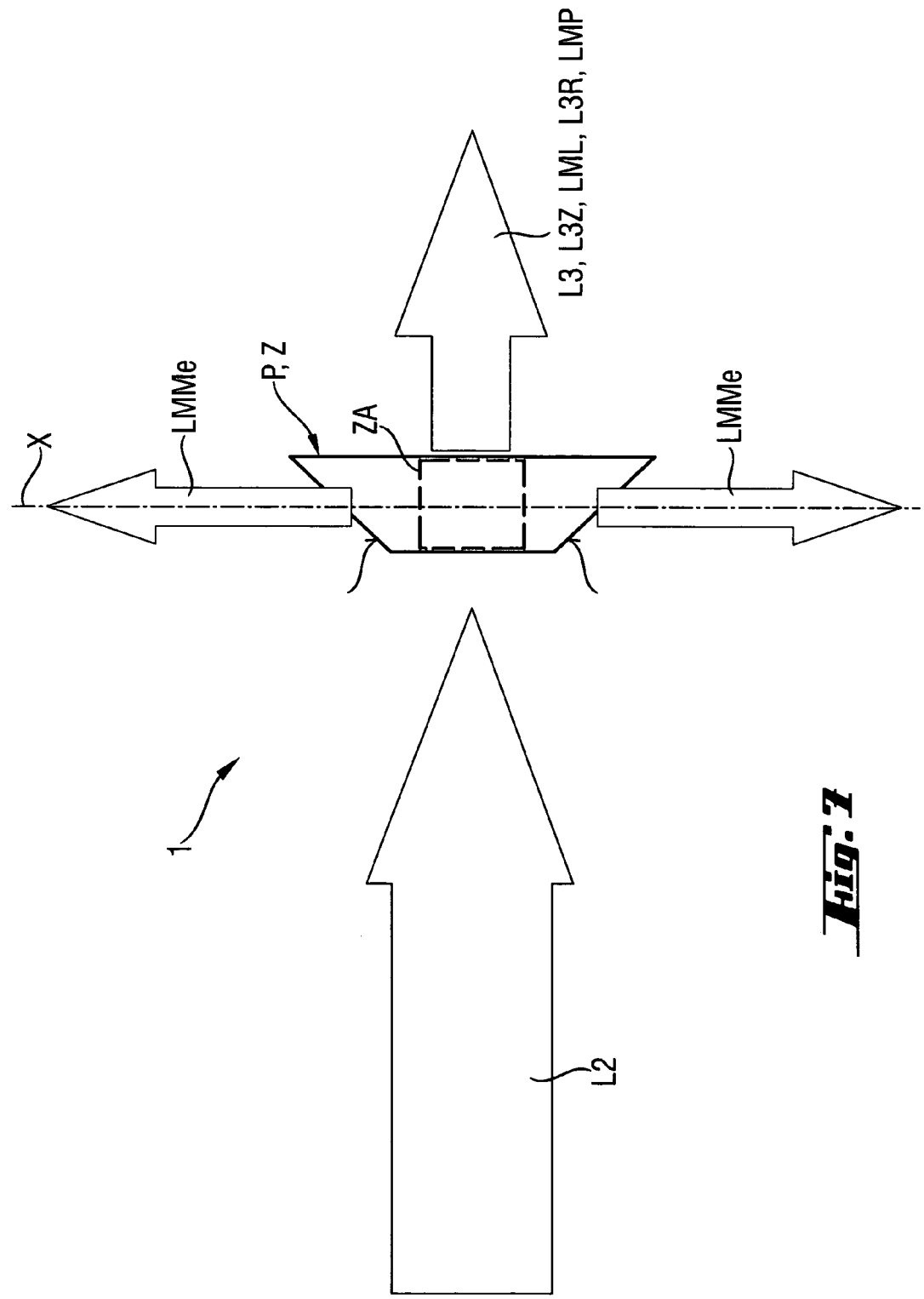

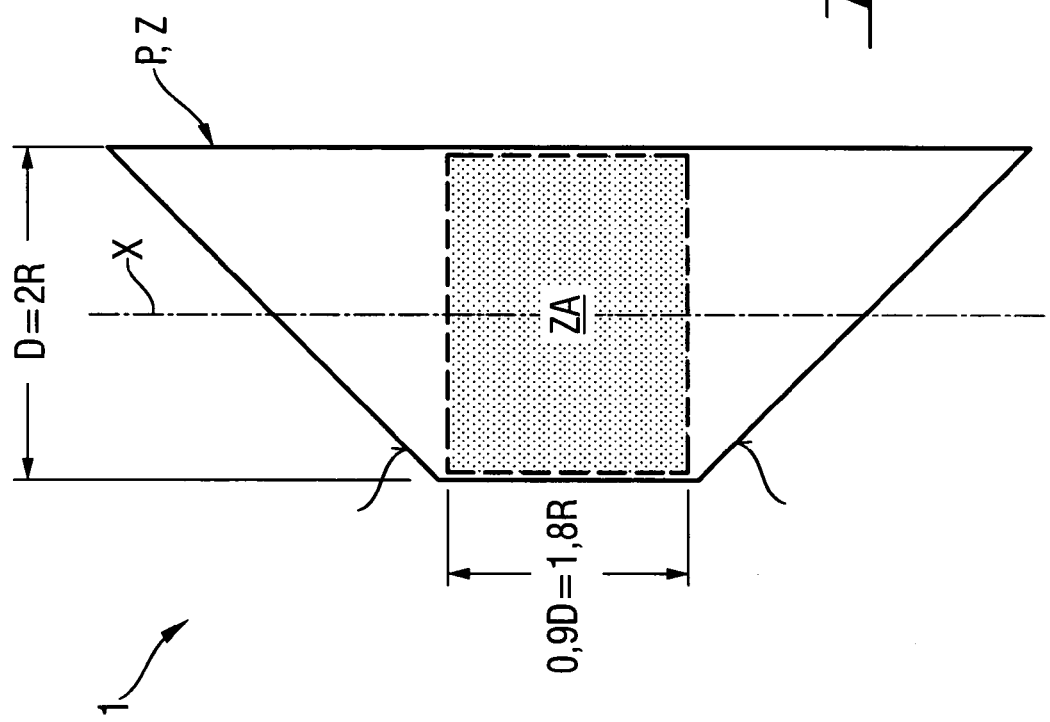

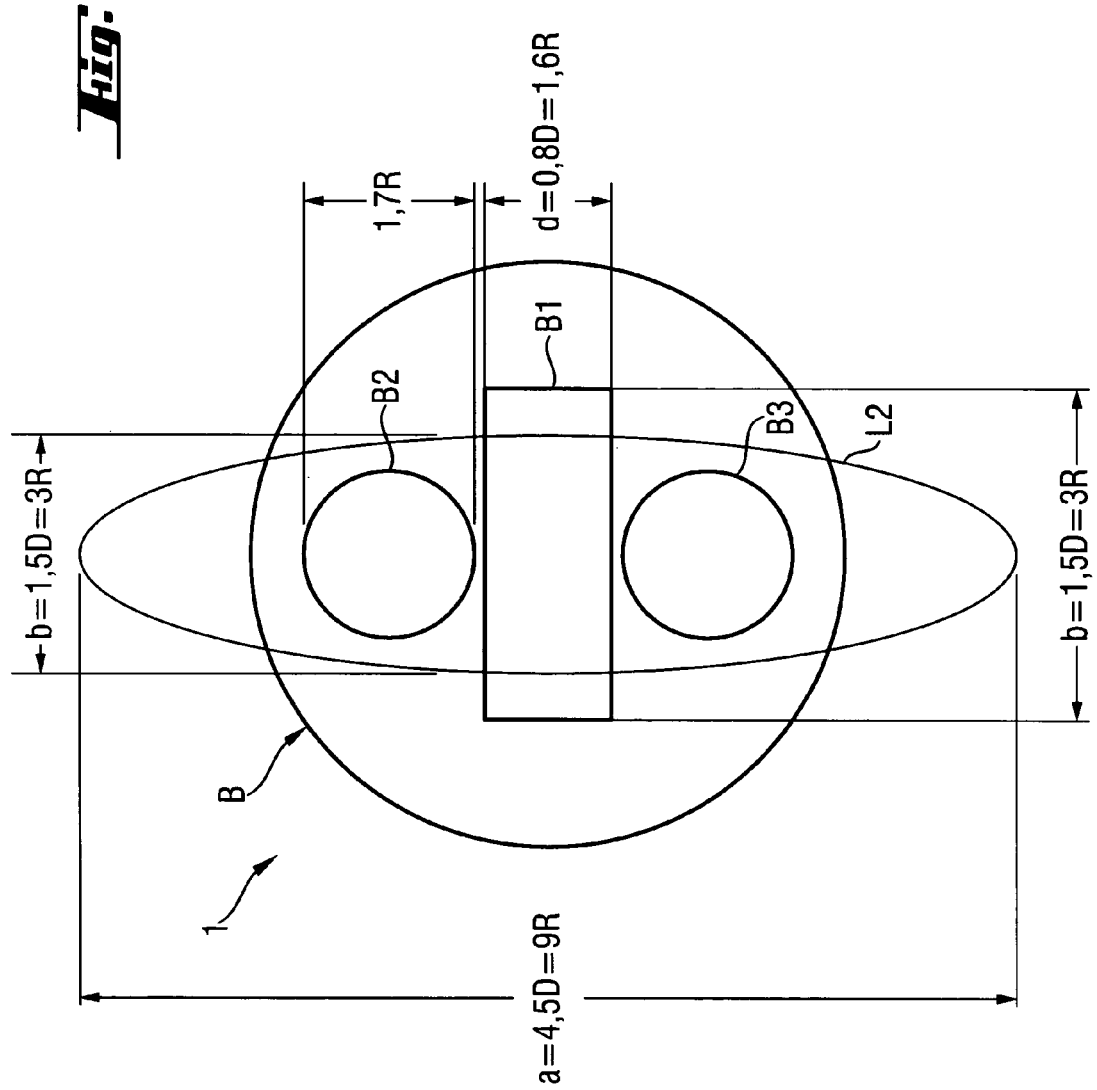

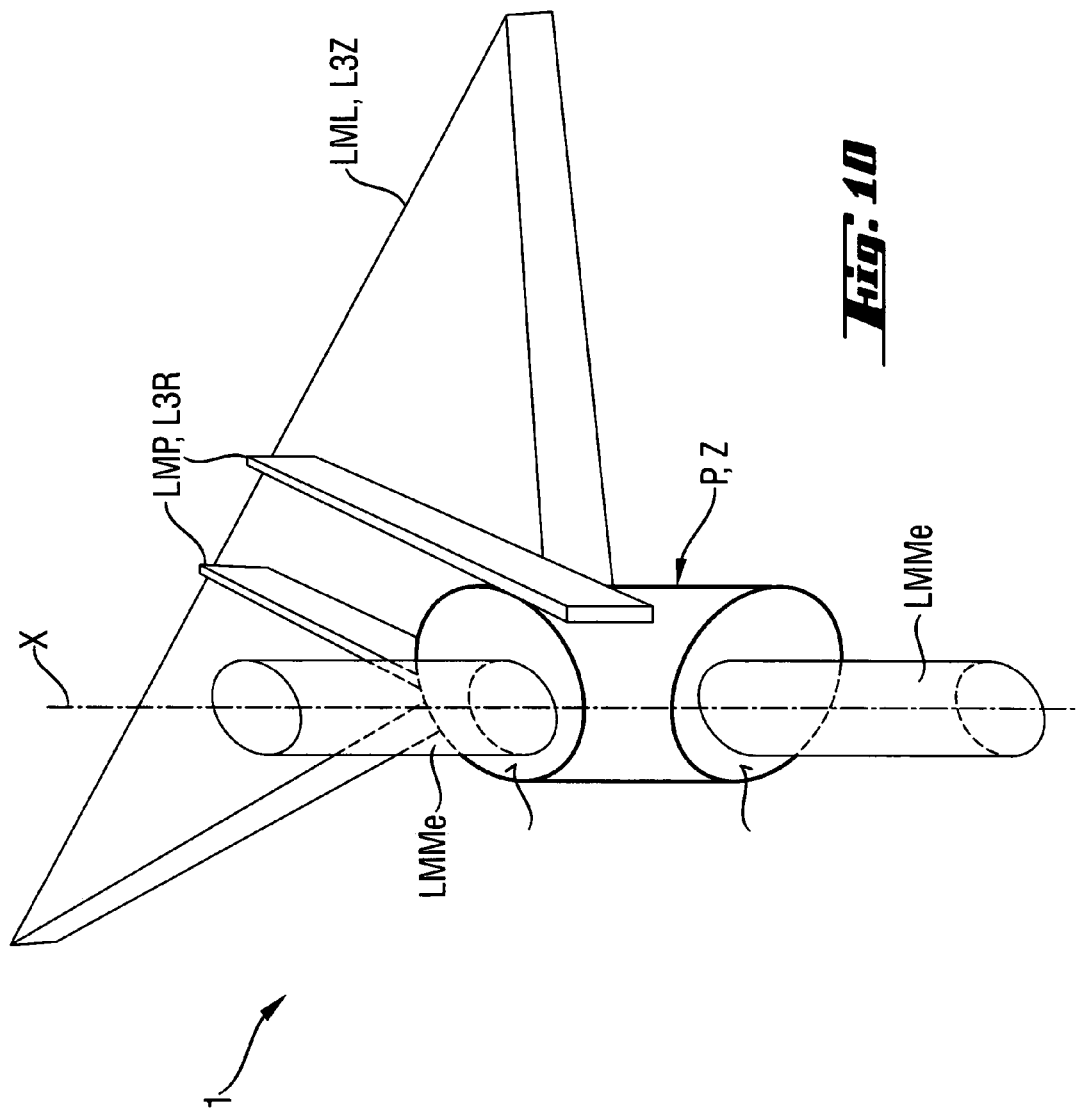

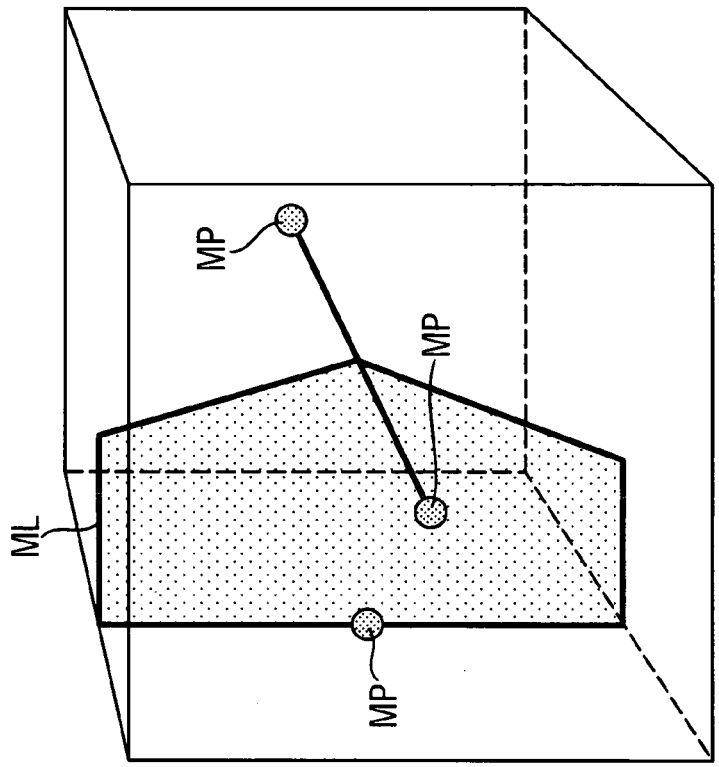
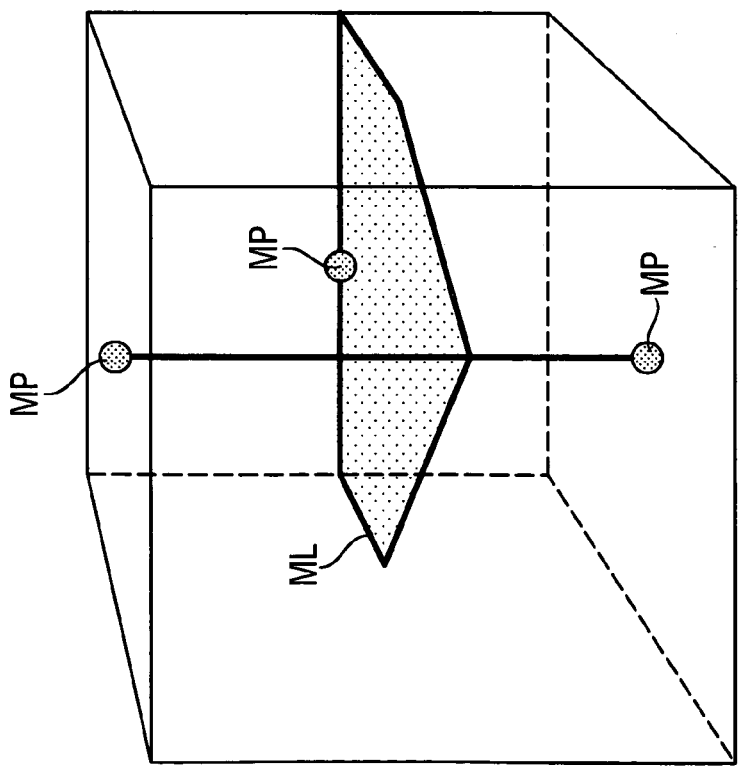
Fig. 14B
Fig. 14A

DEVICE FOR THE GENERATION AND PROJECTION OF LIGHT MARKS

BACKGROUND OF THE INVENTION

The invention is directed to a device for generating and projecting light marks.

In manufacturing processes, design or construction steps and building projects, it is known to use devices by which light marks can be generated and projected in a suitable manner. These light marks are used in the above-mentioned processes to define absolute or relative positions, orientations, and the like, of objects, spatialities or localities and display them to a user.

Known devices for generating and projecting light marks have a light source device, collimating optics and projection optics for this purpose. The light source device serves to generate and radiate a primary light beam bundle. The collimating optics are constructed and provided for receiving the primary light beam bundle, collimating, parallelizing and, in so doing, expanding it into a secondary light beam bundle and for radiating the secondary light beam bundle in a directed manner. The projection optics serve to receive at least a portion of the secondary light beam bundle and to convert the secondary light beam bundle into it least one tertiary light beam bundle or marking beam bundle for at least one light mark and to radiate it and, in so doing, to project at least one light mark.

It is disadvantageous that line marks, that is, light marks in the shape of a line, and point marks or spot marks, that is, light marks in the shape of a point or spot, can be generated and projected simultaneously only at a considerable expense. As a rule, this requires a plurality of projection units with corresponding optics which can be operated independently from one another but must be adjusted and adapted to one another.

It is the object of the invention to develop a device for generating and projecting light marks of the type mentioned above such that easily visible point marks and line marks can be generated and projected in a particularly simple and reliable manner with a particularly low expenditure on optics while dispensing with adjustment processes to a great extent.

SUMMARY OF THE INVENTION

In a device for generating and projecting light marks of the type mentioned above, this object is met by the invention. The device, according to the invention, for the projection of light marks is characterized generally in that the projection optics can be acted upon by the secondary light beam bundle or a portion thereof such that a central beam bundle of the secondary light beam bundle can be radiated through an area of the projection optics substantially completely in such a way and at least one edge beam bundle or marginal beam bundle of the secondary light beam bundle adjacent to the central beam bundle of the secondary light beam bundle can be radiated directly past the edge or outer surface of the projection optics such that the central beam bundle of the secondary light beam bundle can be diffused through interaction with the projection optics and projected substantially in the shape of a line as part of the tertiary light beam bundle or as a line mark beam bundle for a light mark and that the at least one marginal beam bundle of the secondary light beam bundle can be projected substantially in the shape of a point or a spot as part of the tertiary light beam bundle or as a point mark beam bundle for a light mark.

A preferred embodiment of the device, according to the invention, for the projection of light marks is characterized in that the projection optics have a cylindrical lens. Further, the cylindrical lens can be acted upon by the secondary light beam bundle or the portion thereof such that substantially a central beam bundle of the secondary light beam bundle for the light mark can be radiated substantially through a cylinder portion area of the cylindrical lens as the area of the projection optics in the shape of a line and that at least one marginal beam bundle of the secondary light beam bundle adjacent to the central beam bundle of the secondary light beam bundle for the light mark substantially in the shape of a point or a spot can be radiated directly past the edge or outer surface of the cylinder portion as an edge or outer surface of the area of the projection optics.

In this way, using an individual light source device with individual projection optics with, or in the form of, a cylindrical lens, a light mark in the shape of a line, namely, a line mark, and a light mark in the shape of one or two points, namely, a point mark, can be generated and projected simultaneously. Because of the fixed geometry due to the use of an individual cylindrical lens, the line mark and the point mark or point marks are in a given spatial relationship to one another without the need for adjustment. Further, in the device according to the invention, the quantity of optical components is reduced compared to conventional approaches, so that servicing costs and the costs of manufacturing and maintaining a device of this kind are reduced.

Accordingly, one aspect of the invention is that a cylindrical lens provided in the projection optics is irradiated by a light beam bundle resulting as a secondary light beam bundle from a primary light beam bundle through collimation, parallelization and expansion and is acted upon by this secondary light beam bundle such that a portion of the secondary light beam bundle, namely, a central beam bundle, radiates through a portion of the cylindrical lens, namely, a cylinder portion area thereof or a cylinder segment thereof, substantially and that another portion of the secondary light beam bundle, namely, at least one marginal beam bundle, travels or is radiated directly past the edge or outer surface of the cylindrical lens, namely, the cylinder portion area through which the central beam portion radiates substantially completely. The central beam bundle is scattered or dispersed through interaction or refraction with the irradiated cylinder portion area such that, after passing through the cylinder portion area or through the cylinder segment, a light mark in the shape of a line or a line mark results on a remote projection surface during use or in operation. The marginal beam bundles or the marginal beam bundle travel or travels on the outside of the outer surface past the cylindrical lens in the area of the cylinder portion and accordingly forms a corresponding point mark, that is, a light mark in the shape of a point or spot, on a projection surface during use or in operation. When suitably designed, the point mark and the line mark can be arranged in a determined spatial relationship to one another so that a determined spatial reference point can be defined and displayed, e.g., on the line mark by the point mark.

All of this is possible in the prior art, if at all, only at a considerable extra expenditure with a plurality of projection systems, namely, with a separate projection system for each light mark or each type of light mark.

In a preferred embodiment of the device according to the invention, particularly advantageous projection ratios and imaging ratios result when the light source device is designed for generating and radiating substantially coherent and/or monochromatic light for the primary light beam bundle. This results in especially sharp imaging ratios.

In this case, when using two marginal beam bundles which travel past oppositely located edge areas of the cylinder portion area in operation it is also possible under certain symmetric conditions to achieve an interference of two point marks which are still separated in the near field so as to form an individual common point mark in the far field of the light beam field. This has advantages particularly with respect to brightness and, therefore, with respect to the visibility of the point marks.

The light source device can be realized in different ways and in different embodiment forms for generating coherent and/or monochromatic light.

It is advantageous when the light source device has a laser light source or is formed by such a laser light source. This laser light source can generate monochromatic coherent light with high intensity.

Any laser light source can be used in principle. The use of a laser diode or an arrangement of a plurality of laser diodes as light source device or in the area thereof is particularly advantageous. These are especially compact and require comparatively little energy.

The beam shape of the secondary light beam bundle which interacts with the projection optics has a strong influence on quality with respect to brightness, contrast and imaging sharpness in the light marks. In this respect, in another embodiment form of the device according to the invention, a diaphragm device is advantageously provided between the collimating optics and the projection optics for beam shaping with respect to the secondary light beam bundle. This diaphragm device imparts a determined symmetrical shape and spatial extension to the secondary light beam bundle. The diaphragm device can also be a part of the collimating optics.

In certain applications, the diaphragm device can be constructed as a circular diaphragm or as diaphragm in the shape of an ellipse. However, rectangular diaphragms are also possible. These shapes can form the diaphragm device itself or can be component parts of a diaphragm device with a plurality of diaphragms, possibly with other components.

In this respect, it is particularly advantageous when the respective diaphragm device is constructed and arranged, e.g., as a circular diaphragm or a rectangular diaphragm, to be concentric with respect to the cross section of the secondary light beam bundle to be limited. This means that the respective diaphragm device has a geometric center or center of gravity and that this geometric center or center of gravity corresponds approximately to the geometric center or center of gravity of the cross section of the secondary light beam bundle.

With respect to the cylindrical lens for the projection optics, basically all cylindrical shapes are possible. Due to its simplicity, however, the basic shape of a circular cylinder is particularly advantageous. Accordingly, in a particularly preferred embodiment form of the device according to the invention, the cylindrical lens is constructed in the shape of a circular cylinder and has, in particular, a corresponding circle radius R for the circular base surface upon which it is based and a corresponding axis of symmetry X with respect to which the cylindrical lens is constructed to be symmetric with respect to rotation.

To make the principle of the invention more concrete, the size ratios of the individual optical components, respective beam bundles and the light wavelength or light wavelengths that are used are carried out in a suitably selected manner.

The cylindrical lens has, e.g., an optical effective or working diameter D. With respect to the secondary light beam bundle in particular, this optical working diameter is approximately identical to twice the radius R of the circular base upon which the cylindrical lens is based when the latter is based on a circular cylinder.

In a particularly advantageous embodiment of the device according to the invention, the secondary light beam bundle can be formed with a substantially elliptic cross section through selection of the type and/or geometry of the light source device, collimating optics and/or their relationship to one another with respect to geometry and/or position. In particular, this cross section has a defined semi-major axis a and a defined semi-minor axis b.

In an embodiment of the device according to the invention, the semi-major axis a of the cross section of the secondary light beam bundle is selected and arranged to extend approximately perpendicular to the axis of symmetry X of the cylindrical lens.

In this case, it is advantageous that the semi-major axis a of the cross section of the secondary light beam bundle corresponds to approximately 8-times the radius R of the cylindrical lens and 4-times the optical working diameter D of the cylindrical lens. In addition or alternatively, the semi-minor axis b of the cross section of the secondary light beam bundle corresponds to approximately two-times the radius R of the cylindrical lens or one-times the working diameter of the cylindrical lens.

In another embodiment of the device according to the invention, a circular diaphragm is provided whose radius Rkb corresponds to approximately 4-times the radius R of the cylindrical lens or to approximately two-times the optical working diameter D of the cylindrical lens. Alternatively, a rectangular diaphragm can be provided which has a first edge c that is perpendicular to the axis of symmetry X of the cylindrical lens and that corresponds to approximately 3-times the radius R of the cylindrical lens or 1.5-times the optical working diameter D of the cylindrical lens and has a second edge d that is parallel to the axis of symmetry X of the cylindrical lens and that corresponds to approximately 5-times the radius of the cylindrical lens or approximately 2.5-times the optical working diameter D of the cylindrical lens.

In an alternative embodiment of the device according to the invention, the semi-major axis a of the cross section of the secondary light beam bundle is selected and arranged to extend approximately parallel to the axis of symmetry X of the cylindrical lens.

In this variant, it is particularly advantageous when the semi-major axis a of the cross section of the secondary light beam bundle corresponds to approximately 12-times the radius R of the cylindrical lens or to approximately 6-times the optical working diameter D of the cylindrical lens. Alternatively or in addition, the semi-minor axis b of the cross section of the secondary light beam bundle corresponds to approximately 4-times the radius R of the cylindrical lens or to approximately 2-times the working diameter D of the cylindrical lens.

A circular diaphragm or, alternatively, a rectangular diaphragm is also possible in this embodiment of the device according to the invention.

When a circular diaphragm is used, it is advantageous when its radius Rkb corresponds to approximately 4-times or 6-times the radius R of the cylindrical lens and approximately 2-times or approximately 3-times the optical working diameter D of the cylindrical lens.

When a rectangular diaphragm is used, it has a first edge c which is perpendicular to the axis of symmetry X of the cylindrical lens and which corresponds to approximately 3-times or approximately 6-times the radius R of the cylindrical lens and approximately 1.5-times or approximately 3-times the optical working diameter D of the cylindrical lens. Further, the rectangular diaphragm has a second edge d which is parallel to the axis of symmetry X of the cylindrical lens, specifically corresponding to approximately 4-times the radius R of the cylindrical lens and approximately 2-times the optical working diameter D of the cylindrical lens.

The embodiments described above are suitable for forming a line mark on which one or two point marks can be displayed as a reference point.

In a particularly preferred embodiment of the device according to the invention, the cylindrical lens is constructed in the form of an oblique cylinder, at least one base A or end face A being inclined relative to the axis of symmetry X of the cylindrical lens. This inclined base A or end face A is constructed to be reflecting. The arrangement is selected such way that at least a portion of the secondary light beam bundle can be reflected in such a way by the reflecting base A or end face A that an external and additional light mark can be imaged or projected substantially in the shape of a point or spot outside of the plane that is formed by the device itself and by the tertiary light beam bundle for the light mark.

Accordingly, by means of this step, a point mark is imaged or projected upward or downward from the projection plane for the line mark, e.g., but not exclusively perpendicular thereto. Accordingly, e.g., when applied, the line mark can be projected on a wall of a room in a building, while the additional or other point mark appears on the ceiling or on the floor and serves as another reference.

In a particularly advantageous construction of the device according to the invention, the two bases A or end faces A of the cylindrical lens are inclined, reflecting and constructed such that two external and additional light marks can be imaged or projected substantially in the shape of a point or spot.

These and other aspects of the present invention follow from the subsequent description.

Conventionally, line marks can be generated, e.g., as a series of discrete points by means of diffractive elements. This is disadvantageous in that the line is not continuous. Another conventional line mark is produced by a simple cylindrical lens. The disadvantage is that the intensity is distributed on a broad line, so that the line is no longer clearly visible at great distances under certain surrounding light conditions. A reference point, which is desirable in many cases, for example, when the line is oriented perpendicularly in order to determine a level point on the line, can no longer be seen.

The invention makes it possible to image a reference point on a line mark at a great distance without sacrificing the continuity of the line.

The diameter of the laser beam which is collimated or which is focused at a determined distance is greater than the optical working diameter of the cylindrical lens. Accordingly, two edge areas of the collimated laser beam can be propagated farther forward without hindrance. In the near field, a line and two points are formed around the center. After a determined distance from the cylindrical lens which is dependent upon the outer diameter of the cylindrical lens, that is, in the far field, the two marginal beam bundles of the points interfere at a point.

The beam diameter and the diaphragm can take on certain shapes and can be arranged at the margins of the main laser beam in such a way that the formation of the point in the far field is influenced.

The diaphragms can be constructed in the shape of a circle or rectangle.

The major axis or semi-major axis a of the laser beam can extend perpendicular to the cylindrical lens axis Z.

For example, the marginal beam can be cut by a circular diaphragm, so that one side of the marginal beam obtains a curvature, i.e., the marginal beam takes on an asymmetric shape. On the other hand, the marginal beam is approximately symmetrical through a rectangular diaphragm. Accordingly, the diffraction pattern will have improved symmetry.

The influence of the diaphragm size is as follows: the greater the diaphragm diameter or the longer the width of the rectangle, the narrower the diffraction pattern appears in horizontal direction, i.e., there is improved spatial resolution in horizontal direction.

The major axis or semi-major axis a of the ellipse of the cross section of the secondary light beam bundle of the laser beam can also extend parallel to the cylinder axis of the cylindrical lens. These embodiment forms will also be referred to as line-dot lasers. The diaphragm shape has more influence on the diffraction pattern than the diaphragm size because the width of the laser beam in these cases is partly limited. The attempt to increase width results in the great disadvantage of energy loss so that the visibility of the line mark also suffers.

Two point beams which are oriented in opposite directions can be provided, in addition, for external point marks by two mirror surfaces which are integrated on the cylindrical lens. The two ends of the cylindrical lens are then provided with mirror surfaces which extend, e.g., at 45° to the cylinder axis. Further, they are at 90° to one another. This embodiment will also be referred to as a line-multibeam laser.

The major axis a of the ellipse of the laser beam can then be oriented parallel to the connecting line of two circular diaphragms. Two partial beams are deflected by 90° at the two 45-degree mirror surfaces. The short side (or width) b of the cross section of the laser beam must be greater than the diameter D of the cylindrical lens so that a part of the laser beam can propagate farther past the two sides of the cylindrical lens. The two beam points generated in this way are at a 90-degree perpendicular to the surface defined by the line laser.

As is shown in FIG. 12, a combination of line-dot laser and line-multibeam laser can also be provided in a device. It comprises a module A as line-multibeam laser and a module B as line-dot laser. The two modules are fastened to a carrier in such a way that the two line marks of module A and module B are perpendicular to one another and the two point marks face upward and downward in the perpendicular. The point lasers of modules A and B form a rectangular coordinate system and have the same origin (coincidence). The entire construction is suspended by a pendulum, for example, by a stable string or thread. The entire construction is oriented in the vertical through the action of gravitational force and can swing back and forth.

Orientations of the Line-Dot Laser:

There are three possible positions of the line-dot laser:

the line is in the horizontal position;

the line is in the vertical, so that the point mark lies in horizontal position;

the line is oriented such that the point mark lies above the module and in the vertical.

Combinations of these three positions are possible in application through the use of three optics units of this type.

Orientations of the Line-multibeam Laser:

Two possible positions of the line-multibeam laser are conceivable, namely, to orient the laser such that the two beam points lie in the vertical or to orient the laser such that the two beam points and the point mark lie in horizontal position.

BRIEF DESCRIPTION OF THE DRAWINGS

These and other aspects of the present invention will be explained with reference to the drawings, wherein:

FIGS. 1 and 2 are schematic top views in partial section showing two embodiments of the device of the invention, for generating and projecting light marks;

FIGS. 4A–6B are schematic views showing details of different constructional forms of the device, according to the invention, for generating and projecting light marks;

FIGS. 7–10 show different aspects of another embodiment of the device, according to the invention, for generating and projecting light marks;

FIGS. 12–14B show in a schematic view a possible application for the modules from FIGS. 11A an 11B.

DETAILED DESCRIPTION OF THE INVENTION

Figure 3A:
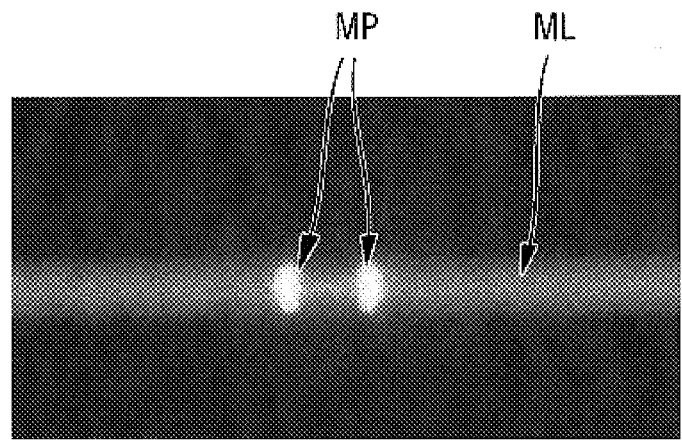
FIGS. 3A and 3B show photographs of light marks in the near field and far field, respectively, that are generated by the device, according to the invention, for generating and projecting light marks.

In the following description, structural elements or structural groups that are similar or identical in construction and/or function are designated by the same reference numbers so as to avoid repetition of a detailed description of these structural elements or groups each time they appear.

FIG. 1 shows a schematic top view of an embodiment of the device 1, according to the invention, for generating and projecting light marks.

The main components of device 1 are the light source device Q, the collimating optics K and the projection optics P. The light source device Q generates primary light in the form of a primary light beam bundle L1. The collimating optics K receive at least a portion of the primary light beam bundle L1 and form a secondary light beam bundle L2 which is collimated, parallelized and possibly expanded compared to the primary light beam bundle L1. Further, the secondary light beam bundle L2 is emitted or radiated through the collimating optics K in a directed manner. This is carried out such that the projection optics P provided in the beam path are irradiated at least in part. In the embodiment of FIG. 1, the projection optics P substantially comprise a cylindrical lens Z. FIG. 1 shows a cross section through the entire optical arrangement of the device 1 according to the invention so that the cylindrical lens Z of the projection optics P appears in the shape of a circle.

According to the invention, the cylindrical lens Z is acted upon by the secondary light beam bundle L2 such that a cylinder portion area ZA of the cylindrical lens Z is substantially irradiated by a central beam bundle L2Z of the secondary light beam bundle L2. At the same time, a marginal beam bundle L2R of the secondary light beam bundle L2 which is directly adjacent to the central beam bundle L2Z travels directly past the outer surface or jacket M of the cylindrical lens Z in a substantially unimpeded manner, namely, in the form of a marginal beam bundle L3R of the tertiary light beam bundle L3. The central beam bundle L2Z of the secondary light beam bundle L2 interacts with the material of the cylindrical lens Z of the projection optics P through refraction. In this way, the central beam bundle L2Z is dispersed, scattered or spread out such that the individual beams of the central beam bundle L3Z exiting the cylindrical lens Z traverse the additional space to be substantially dispersed in a well-defined plane.

In the embodiment of FIG. 1, two marginal beams L2R and L3R of the secondary light beam bundle L2 and of the tertiary light beam bundle L3, respectively, are provided. In application, these marginal beam bundles L2R, L3R result in the formation of point marks MP when an object, e.g., in the form of a wall W, is struck by the tertiary light beam bundle L3. The arrangement in FIG. 1 shows the near field in which the two marginal beam bundles L2R, L3R still result in separate point marks MP.

At the same time, the corresponding line mark ML which is generated by the corresponding central beam bundle L3Z of the tertiary light beam bundle L3 is shown on the wall W.

The marginal beam bundles L3R of the tertiary light beam bundle L3 accordingly form beam bundles LMP for point marks, while the central beam bundle L3Z of the tertiary light beam bundle L3 forms a beam bundle LML for the line mark.

In the embodiment of FIG. 1, a diaphragm device B is provided between the collimating optics K and the projection optics P for influencing the geometry of the secondary light beam bundle L2 and the corresponding marginal beams L2R and central beams L2Z.

FIG. 2 shows a construction similar to the construction in FIG. 1 for a device 1, according to the invention, for generating and radiating light marks. In this case, the light source device Q comprises a laser diode or a laser diode array. Further, the collimating optics are made more concrete in that the different optical input lens systems and output lens systems are indicated. A diaphragm such as that of FIG. 1 is integrated in the collimating optics K in this instance.

FIG. 3A shows a photograph of the light marks projected on the wall W in the shape of line marks ML and in the shape of two point marks MP as was already indicated schematically in FIG. 1. FIG. 3A shows the ratios of the radiation field in the near area, that is, in the near field of the intensity distribution.

Figure 3B:
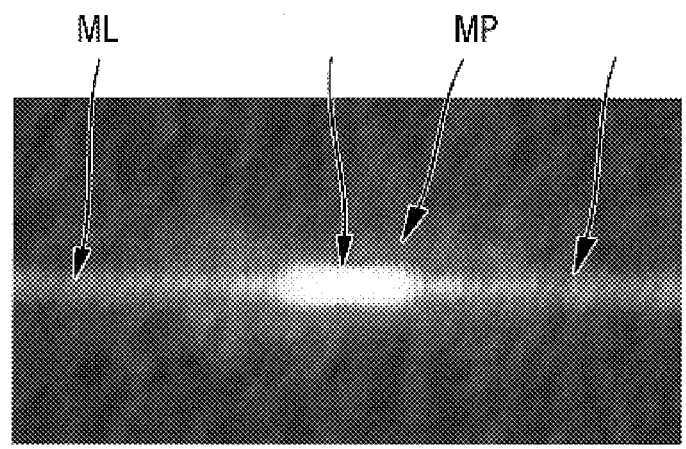

In contrast, FIG. 3B shows a photograph of the intensity distribution in the far field, that is, at a comparatively far distance from the device 1 for generating and projecting light marks. Due to the characteristics of the optical arrangement and the light that is used, the two marginal beams L3R of the tertiary light beam bundle L3 are superimposed through interference so that an individual superimposed point mark MP can now be detected in addition to the line mark ML on the wall W.

FIGS. 4A to 5B show different geometric relationships between the secondary light beam bundle L2 of the utilized diaphragm B or diaphragm device B and the cylindrical lens Z of the projection optics P.

In the following drawings, it is assumed that the cylindrical lens Z of the projection optics P is based on a circular cylinder which has a circle with radius R as a base surface. In a corresponding manner, the cylindrical lens Z has, in the following drawings, an effective or optical working diameter D which corresponds to two-times the radius R. Therefore, all other specifications are relative indications compared to the radius R of the circular base upon which the cylindrical lens Z is based.

Further, the secondary light beam bundle L2 has an elliptic cross section with a semi-major axis a and a semi-minor axis b.

Figure 4B:
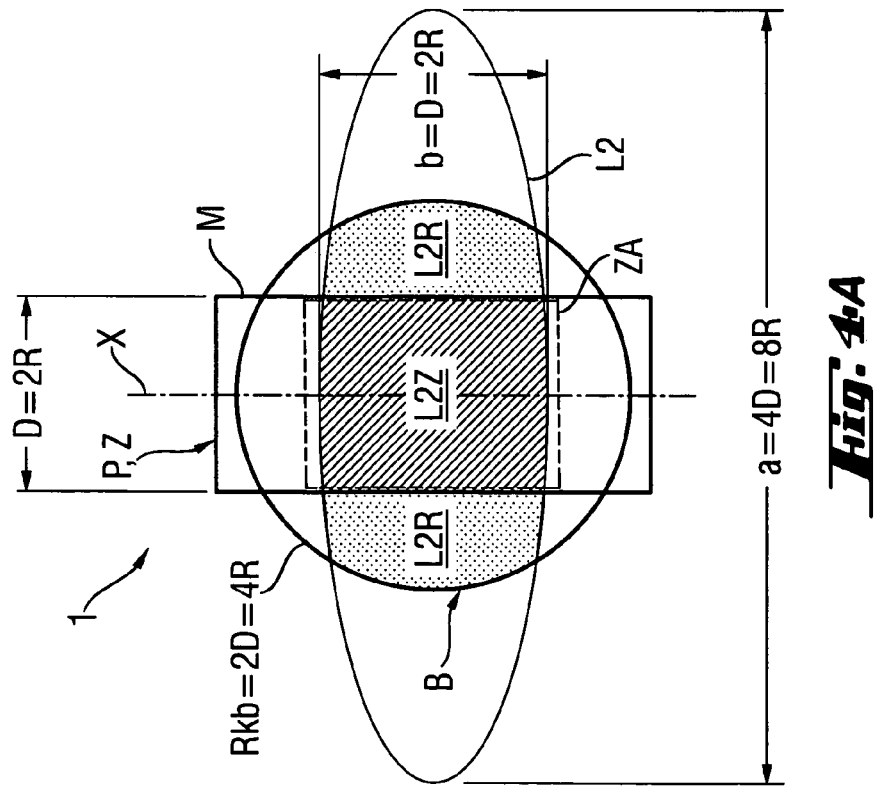
Figure 4A:
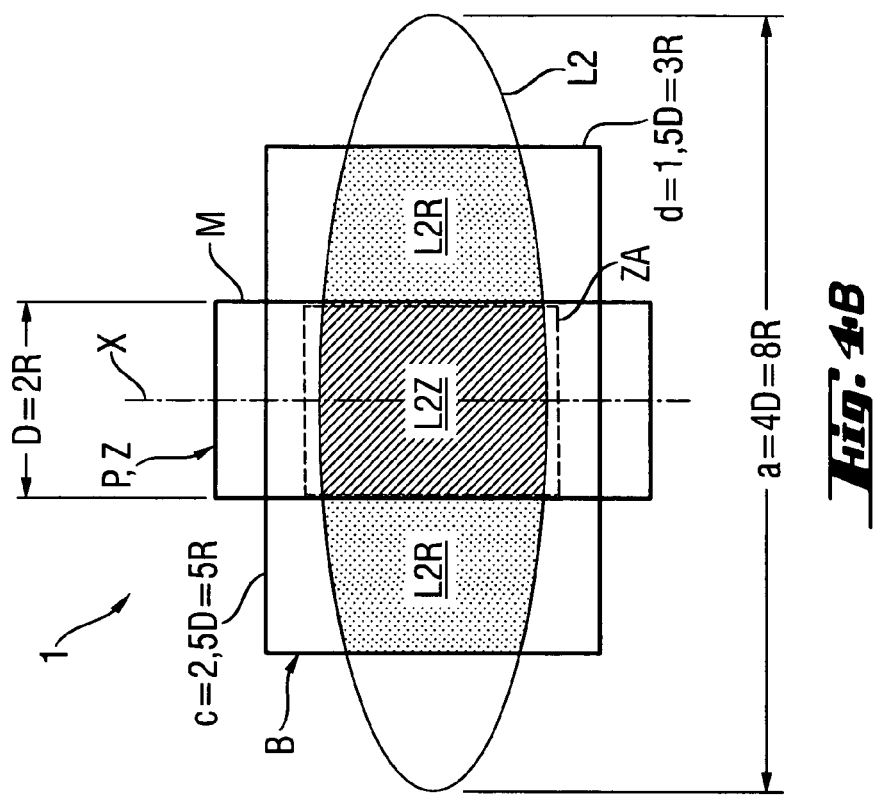

In the embodiment of FIG. 4A, the semi-major axis a is oriented perpendicular to the axis of symmetry X of the cylindrical lens Z and corresponds to approximately 8-times the radius of the cylindrical lens Z and the simple optical working diameter D of the cylindrical lens Z. The semi-minor axis b of the secondary light beam bundle L2 is oriented parallel to the axis of symmetry X of the cylindrical lens Z and corresponds to twice the radius R of the cylindrical lens Z or the optical working diameter D of the cylindrical lens Z. In the embodiment of FIG. 4A, a circular diaphragm B with a diaphragm diameter Rkb is used which corresponds to twice the optical working diameter D of the cylindrical lens Z, that is, to 4-times the radius of the cylindrical lens Z. The diaphragm B and the secondary light beam bundle L2 are arranged concentric to one another. The marginal beam bundles L2R of the secondary light beam bundle L2 which travel past the jacket M of the cylindrical lens Z are also shown. The central beam bundle L2Z of the secondary light beam bundle L2 which is radiated substantially completely through the cylinder portion area ZA of the cylindrical lens Z of the projection optics P can also be seen.

In contrast to FIG. 4A, a rectangular diaphragm B is used in FIG. 4B. This rectangular diaphragm B has a longitudinal edge or long edge c=5 R=2.5 D which extends perpendicular to the axis of symmetry X of the cylindrical lens Z. The small edge d=3 R=1.5 D is oriented parallel to the axis of symmetry X of the cylindrical lens Z. In this arrangement, the cross section of the secondary light beam bundle L2 is also concentric to the rectangular diaphragm.

In the embodiment of FIGS. 5A to 6B, the semi-major axis a of the cross section of the secondary light beam bundle L2 is oriented parallel to the axis of symmetry X of the cylindrical lens Z and has an extension corresponding to 12-times the radius R of the cylindrical lens Z and 6-times the optical working diameter D of the cylindrical lens Z. The semi-minor axis b of the cross section of the secondary light beam bundle L2 is formed perpendicular to the axis of symmetry X of the cylindrical lens Z and has an extension corresponding to 4-times the radius R of the cylindrical lens Z and twice the optical working diameter D of the cylindrical lens Z.

Figure 5A:
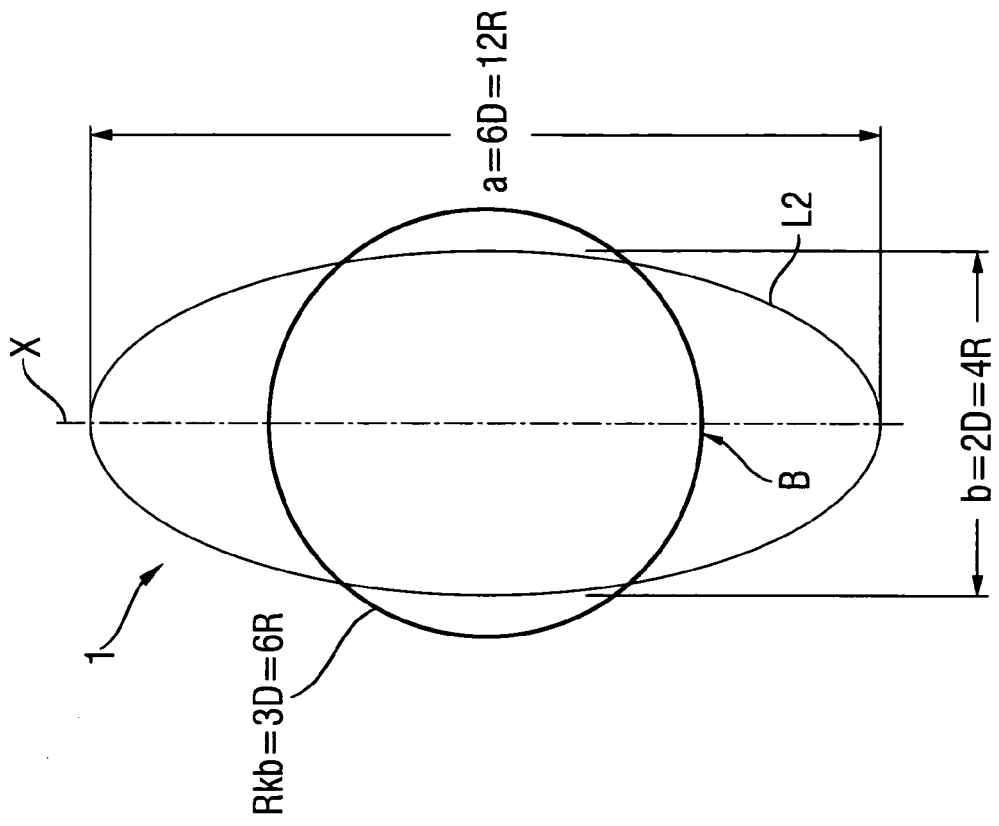
Figure 5B:
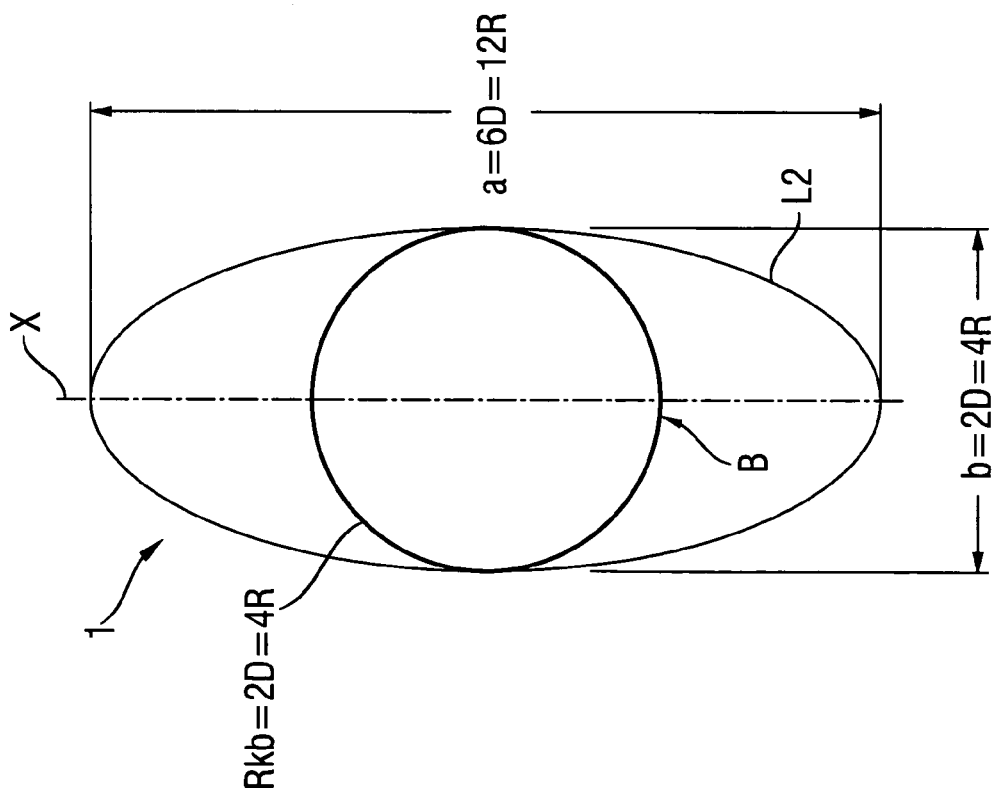

In the embodiment of FIGS. 5A and 5B, circular diaphragms B are provided, namely, concentric to the cross section of the secondary light beam bundle L2 and with radii Rkb=4 R=2 D and Rkb=6 R=3 D.

A rectangular diaphragm B is provided, respectively, in FIGS. 6A and 6B, specifically with a long edge c parallel and perpendicular, respectively, to the axis of symmetry X of the cylindrical lens Z. The long edge c has an extension corresponding to 4-times the radius R of the cylindrical lens Z (2-times the optical working diameter D) and 6-times the radius of the cylindrical lens Z (3-times the optical working diameter D). The short edge d of the rectangular diaphragm B of FIGS. 6A and 6B satisfies the conditions d=3 R=1.5 D or d=4 R=2D.

FIGS. 7 to 10 show forms of the device 1, according to the invention, for generating and projecting light marks in which the cylindrical lens Z of the projection optics P is based on an oblique cylinder, specifically with end faces A which are inclined by 45° to the axis of symmetry X of the cylindrical lens Z and which, further, are reflecting and arranged in such a way that a portion of the secondary light beam bundle L2 can be reflected at the end faces A such that external and additional point marks (MPe) can be projected and imaged perpendicular to the projection plane for the line mark ML. The additional and external point marks or spot marks MPe are transmitted via light beam bundles LMMe reflected at the reflecting end faces A of the cylindrical lens Z as is shown schematically in FIG. 7.

FIG. 8 shows another schematic, sectional side view of the arrangement represented in FIG. 7. Additional indications of dimensioning are also provided. The diameter of the cylindrical lens Z is again designated by R. The cylinder portion area ZA which is constructed for projecting the line mark for generation has a height corresponding to 1.8-times the radius R of the cylindrical lens Z.

FIG. 9 shows details referring to the secondary light beam bundle L2 and the diaphragm B which could be used in a special embodiment form of the device 1, shown in FIGS. 7 and 8, for generating and projecting light marks.

Also, in the embodiment of FIG. 9, the semi-major axis a, not shown in FIG. 9, is oriented parallel to the axis of symmetry X of the cylindrical lens Z and has an extension corresponding to 9-times the radius R of the cylindrical lens Z and 4.5-times the optical working diameter D of the cylindrical lens Z. The semi-minor axis b of the cross section of the secondary light beam bundle L2 is elongated perpendicular to the axis of symmetry X of the cylindrical lens Z and has an extension of approximately 3-times the radius R of the cylindrical lens Z and 1.5-times the optical working diameter D of the cylindrical lens Z. The diaphragm B comprises a circular plate with three recesses B1, B2 and B3. The first recess B1 has a rectangular shape for generating the marginal beam bundles L2R and the central beam bundle L2Z for generating the actual light mark ML and the actual point mark MP. The long edge c=3.5 R=1.75 D is oriented perpendicular to the axis of symmetry X of the cylindrical lens Z, whereas the short edge d=1.6 R=0.8 D is arranged parallel to the axis of symmetry X of the cylindrical lens Z. The recesses B2 and B3 of the diaphragm device B are substantially identical, circular and have a radius Rkb=1.7 R=0.85 D. These circular recesses B2 and B3 are constructed with cylindrical end faces A which are reflecting and approximately concentric.

FIG. 10 is a perspective top view showing the ratios that can result when applying the arrangement shown in FIGS. 7 to 9. The incident secondary light beam bundle L2 is not shown in the arrangement in FIG. 10. Upper and lower end faces A are formed as mirrors at the cylindrical lens Z of the projection optics P in the shape of an oblique cylinder. Portions of the secondary light beam bundle L2, not shown, are reflected perpendicularly upward and downward at these reflecting end faces of the cylindrical lens Z, namely, in the shape of beam bundles LMMe for external point marks MPe to be carried out. The expression "perpendicular" refers to that plane formed by the tertiary beam light bundle L3Z or line mark beam bundle LML. Also shown is the point mark beam bundle LMP which also appears in the form of the marginal beams L3Z of the tertiary beam bundle L3.

Figure 11B:
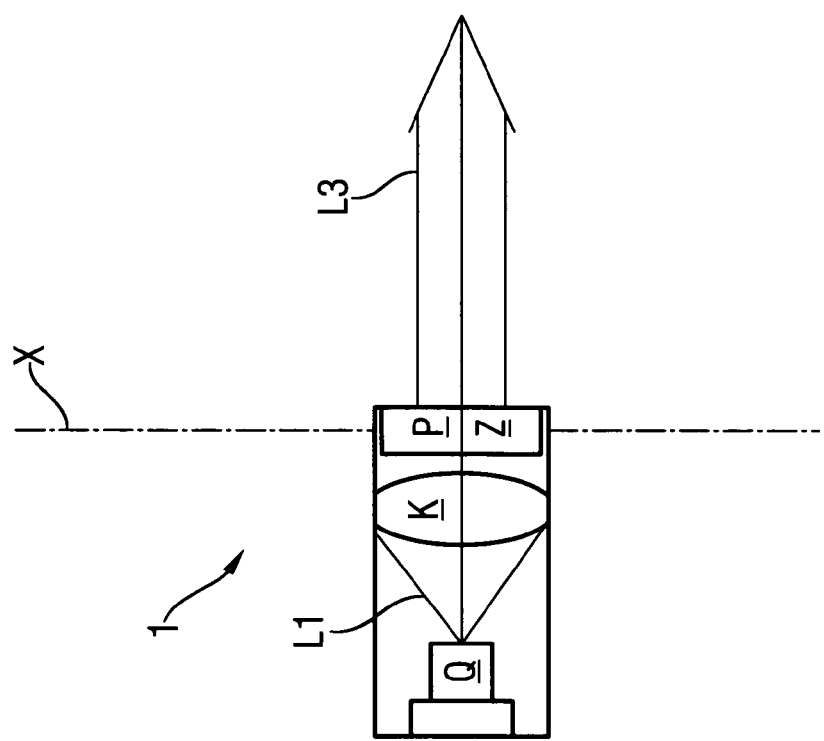
FIGS. 11A and 11B show two modules using the device, according to the invention, for generating and projecting light marks.
Figure 11A:
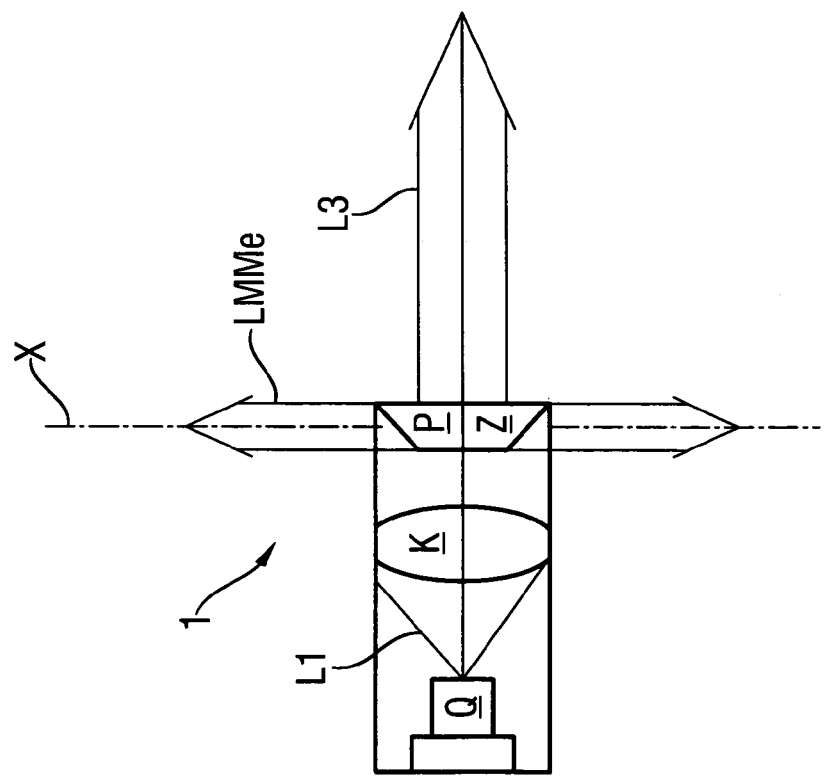

FIGS. 11A and 11 again show devices 1, according to the invention, which are constructed in the form of modules A and B, specifically, in lateral cross sectional views. Module A corresponds approximately to an embodiment form such as is shown in FIGS. 7 to 10. On the other hand, module B substantially has the structure shown in FIGS. 1 to 6B.

Figure 12:
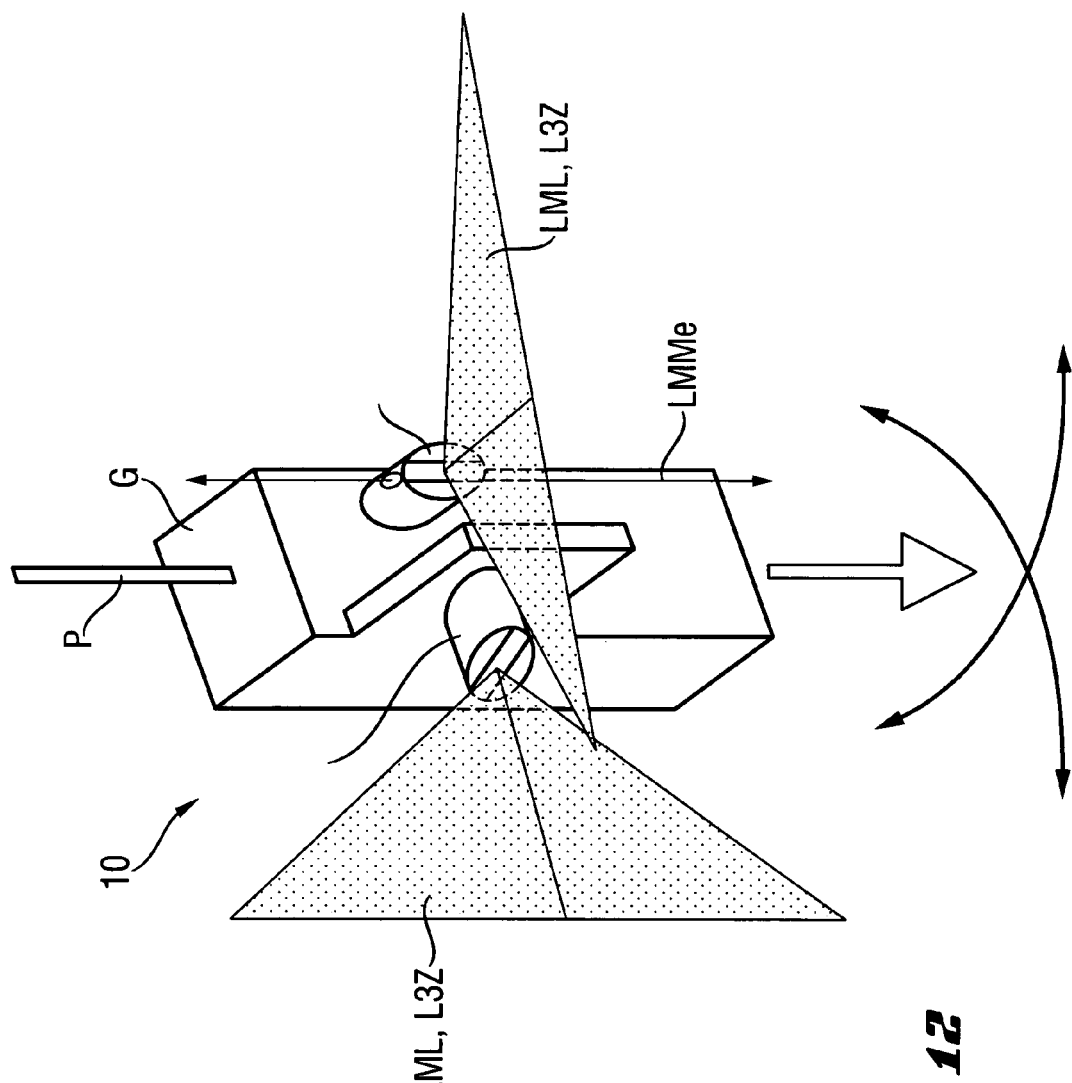

FIG. 12 shows an arrangement of modules A and B in the area of a positioning device 10. This positioning device 10 is formed by a module carrier G, e.g., in the form of a housing, in which or at which modules A and B, and possibly additional modules, are fastened and arranged. The arrangement of modules A and B is carried out such that the planes defined by the tertiary light beam bundles L3 extend approximately perpendicular to one another and such that the straight lines defined by the respective point mark beam bundles LMP are likewise perpendicular to one another. The housing or module carrier G is fastened to a pendulum thread F such that when orientation of the pendulum formed by the pendulum thread F and module carrier G is perpendicular, e.g., in the Earth's gravitational field, the pendulum thread F extends perpendicular on the plane defined by module A and extends parallel to the plane defined by module B.

Figure 13:
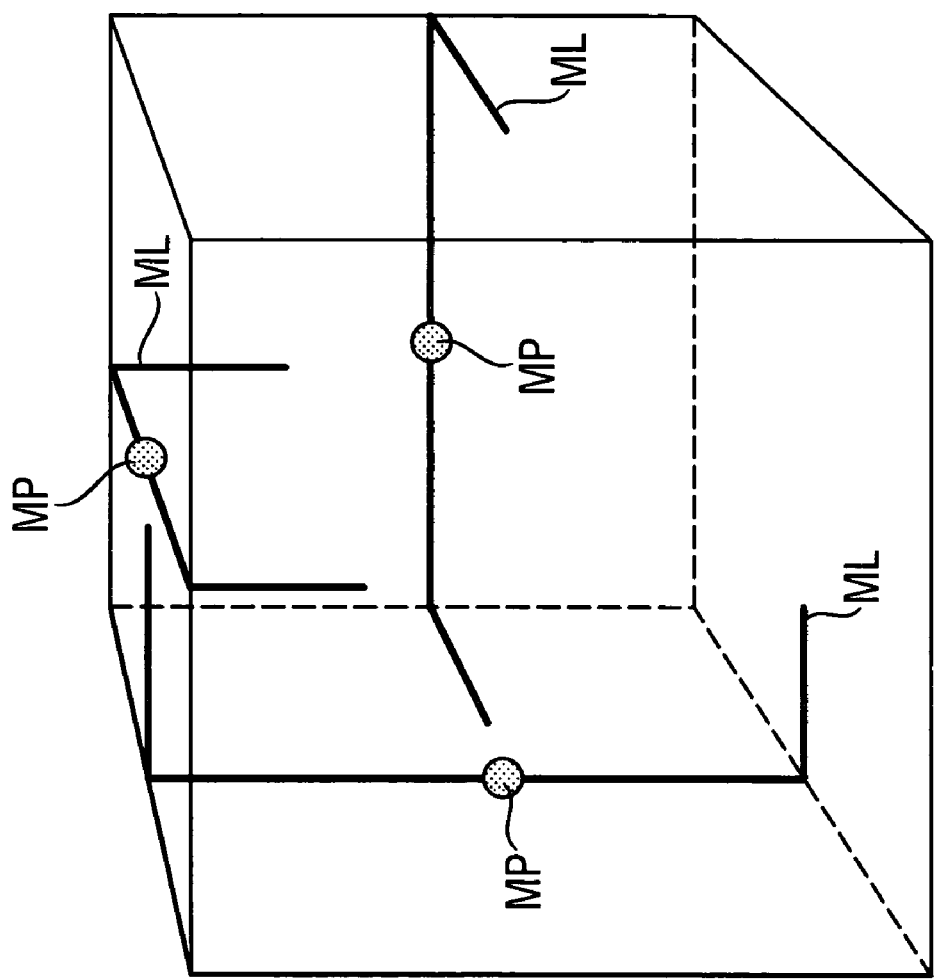

The arrangements shown in FIGS. 13 to 14B describe possible positions and orientations that are conceivable in the embodiment of FIGS. 1 to 6B and in the embodiment of FIGS. 7 to 10. According to FIG. 13, an arrangement according to FIGS. 1 to 6B can assume three different basic positions relative to one another. In the embodiment of FIGS. 7 to 10, on the other hand, only two fundamentally different positions are possible in two-dimensional space.

What is claimed is:

1. A device for generating and projecting light marks, comprising a light source device for generating and radiating a primary light beam bundle, collimating optics for receiving the primary light beam bundle and for collimating, parallelizing and expanding the primary light beam bundle into a secondary light beam bundle and for radiating the secondary light beam bundle in a directed manner, and projection optics for receiving at least a portion of the secondary light beam bundle and converting the at least a portion of the secondary light beam bundle into at least one of a tertiary light beam bundle (L3) and marking beam bundle for at least one light mark and radiating and projecting the at least one light mark, wherein the projection optics is acted upon by the at least a portion of the secondary light beam bundle such that a central beam bundle of the secondary light beam bundle can be radiated through an area of the projection optics, at least one marginal beam bundle of the secondary light beam bundle adjacent to the central beam bundle of the secondary beam bundle can be radiated directly past an edge or outer surface of the area of the projection optics, the central beam bundle of the secondary light beam bundle diffused through interaction with a cylindrical lens to be projected substantially in a shape of a line as part of the tertiary light beam bundle (L3) or as a line mark beam bundle for a light mark, and the at least one marginal beam bundle (L2R) of the secondary light beam bundle can be projected substantially in one of a point and a spot as part of the tertiary light beam bundle or as a point mark bundle for a light mark.

2. The device of claim 1, wherein the projection optics have the cylindrical lens, and the cylindrical lens can be acted upon by the at least the portion of the secondary light beam bundle such that the central beam bundle of the secondary light beam bundle for the light mark can be radiated substantially through a cylinder portion area of the cylindrical lens as the area of the projection optics in the shape of a line, and the at least one marginal beam bundle of the secondary light beam bundle adjacent to the central beam bundle of the secondary light beam bundle for the light mark in the shape of one of a point and a spot can be radiated directly past one of the edge and the outer surface of the cylinder portion area.

3. The device of claim 1, wherein the light source device is designed for generating and radiating at least one of coherent and monochromatic light for the primary light beam bundle.

4. The device of claim 1, wherein the light source device has a laser light source or is a laser light source.

5. The device of claim 1, wherein the light source device has a laser diode or an arrangement of a plurality of laser diodes or is formed by a plurality of laser diodes.

6. The device of claim 1, wherein a diaphragm device is provided between the collimating optics and the projection optics for beam shaping with respect to the secondary light beam bundle.

7. The device of claim 6, wherein the diaphragm device has or is formed by a circular diaphragm or a rectangular diaphragm provided and arranged substantially concentric to a cross section of the secondary light beam bundle.

8. The device of claim 1, wherein the cylindrical lens is a circular cylinder and has a given radius for a circular base upon which the cylindrical lens is based and an axis of symmetry.

9. The device of claim 8, wherein the cylindrical lens has an optical working diameter that corresponds to twice the radius of the circular base upon which the cylindrical lens is based.

10. The device of claim 1, wherein the secondary light beam bundle can be formed with a substantially elliptic cross section through selection of type and geometry of the light source device, the collimating optics and the relationship of the light source device and the collimating optics to one another with respect to at least one of geometry and position with a semi-major axis and a semi-minor axis.

11. The device of claim 10, wherein the semi-major axis of the cross section of the secondary light beam bundle is selected and arranged to extend approximately perpendicular to the axis of symmetry of the cylindrical lens.

12. The device of claim 11, wherein the semi-major axis of the cross section of the secondary light beam bundle corresponds to approximately 8-times the radius of the cylindrical lens and 4-times the optical working diameter of the cylindrical lens, and the semi-minor axis of the cross section of the secondary light beam bundle corresponds to approximately one of two-times the radius of the cylindrical lens and one-times the working diameter of the cylindrical lens.

13. The device of claim 11, further comprising a circular diaphragm with a radius corresponding to approximately 4-times the radius of the cylindrical lens and approximately two-times the optical working diameter of the cylindrical lens, a rectangular diaphragm having a first edge that is perpendicular to the axis of symmetry of the cylindrical lens and corresponding to approximately 3-times the radius of the cylindrical lens and approximately 1.5-times the optical working diameter of the cylindrical lens and having a second edge that is parallel to the axis of symmetry of the cylindrical lens and is one of approximately 5-times the radius of the cylindrical lens and approximately 2.5-times the optical working diameter of the cylindrical lens.

14. The device of claim 10, wherein the semi-major axis of the cross section of the secondary light beam bundle extends parallel to the axis of symmetry of the cylindrical lens.

15. The device of claim 14, wherein the semi-major axis of the cross section of the secondary light beam bundle is approximately 12-times the radius of the cylindrical lens and approximately 6-times the optical working diameter of the cylindrical lens, and the semi-minor axis of the cross section of the secondary light beam bundle corresponds to approximately 4-times the radius of the cylindrical lens and approximately 2–5imes the working diameter of the cylindrical lens.

16. The device of claim 14, wherein a circular diaphragm is provided whose radius corresponds to approximately 4-times or 6-times the radius of the cylindrical lens and approximately 2-times or approximately 3-times the optical working diameter of the cylindrical lens, and wherein a rectangular diaphragm having a first edge is perpendicular to the axis of symmetry of the cylindrical lens and corresponds to one of approximately 3-times and approximately 6-times the radius of the cylindrical lens and one of approximately 1.5-times and approximately 3-times the optical working diameter of the cylindrical lens, and having a second edge that is parallel to the axis of symmetry of the cylindrical lens that corresponds to approximately 4-times the radius of the cylindrical lens and approximately 2-times the optical working diameter of the cylindrical lens.

17. The device of claim 10, wherein the cylindrical lens is an oblique cylinder and has one of at least one base and end face inclined relative to an axis of symmetry of the cylindrical lens, one of the base (A) and end face (A) is reflected, and at the least a portion of the secondary light beam bundle is reflected by on of the base (A) and end face (A) such that an external and additional light mark can be one of imaged and projected substantially as one of a point and a spot outside of the plane formed by the device and the tertiary light beam bundle for the light mark.

18. The device of claim 17, wherein one of the two bases and end faces of the cylindrical lens are inclined and reflected such that two external and additional light marks are one of imaged and projected substantially as one of a point and a spot.

* * * * *